(12) United States Patent
Lin et al.

(10) Patent No.: US 7,055,010 B2
(45) Date of Patent: May 30, 2006

(54) SNAPSHOT FACILITY ALLOWING PRESERVATION OF CHRONOLOGICAL VIEWS ON BLOCK DRIVES

(75) Inventors: Alvis Lin, Taipei (TW); Cheen Liao, Taipei (TW)

(73) Assignee: Synology Inc., Taipei (TW)

( * ) Notice: Subject to any disclaimer, the term of this patent is extended or adjusted under 35 U.S.C. 154(b) by 392 days.

(21) Appl. No.: 10/701,129

(22) Filed: Nov. 3, 2003

(65) Prior Publication Data

US 2004/0093474 A1 May 13, 2004

Related U.S. Application Data

(60) Provisional application No. 60/424,501, filed on Nov. 6, 2002.

(51) Int. Cl.
*G06F 12/16* (2006.01)

(52) U.S. Cl. ........................... 711/162; 707/204

(58) Field of Classification Search ............... 707/10, 707/200, 202; 711/162, 152, 164; 714/1, 714/5

See application file for complete search history.

(56) References Cited

U.S. PATENT DOCUMENTS

| | | | | |
|---|---|---|---|---|
| 5,175,849 A | * | 12/1992 | Schneider | 707/202 |
| 5,241,668 A | * | 8/1993 | Eastridge et al. | 714/5 |
| 5,241,670 A | * | 8/1993 | Eastridge et al. | 714/1 |
| 5,734,814 A | | 3/1998 | Corbin et al. | |
| 6,105,030 A | * | 8/2000 | Syed et al. | 707/10 |
| 6,473,775 B1 | * | 10/2002 | Kusters et al. | 707/200 |
| 6,892,211 B1 | * | 5/2005 | Hitz et al. | 707/202 |
| 6,938,135 B1 | * | 8/2005 | Kekre et al. | 711/162 |

* cited by examiner

*Primary Examiner*—Pierre Michel Bataille
*Assistant Examiner*—Chase Peers
(74) *Attorney, Agent, or Firm*—Perkins Coie LLP

(57) ABSTRACT

A method for efficiently maintaining snapshot instances. To maintain the state of snapshot instances, the snapshot copies the data needed to be protected into free space on the same volume. In order to identify whether a block is free, a snapshot record is created for each block on a volume to record write operations on the block. With these snapshot records, the allocation status of blocks on a volume can quickly be identified. Free space allocation is then accomplished by allocating free space via the file-system provided interface and identifying it with snapshot records. With this mechanism, snapshot software can allocate free space to store snapshot metadata and "copy-to-write" data dynamically.

9 Claims, 11 Drawing Sheets

SNAPSHOT FACILITY ALLOWING PRESERVATION OF CHRONOLOGICAL VIEWS ON BLOCK DRIVES

CROSS-REFERENCE TO RELATED APPLICATION(S)

This application claims priority under 35 U.S.C. §119 to U.S. Provisional Application No. 60/424,501 filed Nov. 6, 2002.

TECHNICAL FIELD

The present invention relates generally to storage on computer systems, and more particularly, to a computer-implemented software facility for maintaining multiple snapshot instances on storage block devices.

BACKGROUND

A "snapshot instance" (or simply "snapshot") as used in the computer storage art represents a state of the information stored on a volume of storage media at the time this instance was created. From a file system point of view, a snapshot instance preserves the structure of the file system operating on the corresponding volume. Snapshot software is designed to interface with file systems and block (storage) devices to provide snapshot functions, namely snapshot creation, snapshot deletion and snapshot restoration.

To maintain the state of snapshot instances, when a write operation occurs on a volume, the snapshot software will typically receive a notification event. Snapshot software can copy the data on the block to other free space when needed. The method is commonly referred to as "copy-on-write." To achieve good space utilization, it is desirable to keep the "copy-on-write" backup data on the same volume.

However, there are problems associated with maintaining multiple snapshot instances while performing "copy-on-write" operations and snapshot functions on the same volume. One problem is that every "copy-on-write" process needs free space on the volume to store the copy-on-write protected data. Free space is simply a block that is currently not used by file-system and all snapshot instances created on the volume.

With prior systems, each snapshot instance has its own set of free space, referred to as a differential file. The differential file contains all modifications to the data since a past time (the original data). In order to recover the data from the past time, the current data and the differential file are integrated to recreate the original data. As more and more snapshot instances created, the number of differential files grows. Since each differential file uses its own free space, this would cause adverse effect to free space utilization. On the other hand, it is not trivial for multiple snapshot instances to share copy-on-write protected data. When one of the snapshot instances is deleted, these copy-on-write protected data stored on its differential file may need to be moved to other differential files.

Free space identification is another problem. With prior systems, multiple file-system allocation bitmaps need to be created for each snapshot instance to identify free space. Another problem arises when the need for snapshot restoration emerges. The system needs to maintain all other snapshot instances while the file-system is reverted to the state of one snapshot instance. Prior systems are not designed for this kind of application and does not provide a snapshot restoration mechanism.

An efficient mechanism for providing creation, deletion and restoration functions on multiple snapshot instances of a volume is thus presented herein.

DETAILED DESCRIPTION

The present invention describes a method for efficiently maintaining snapshot instances. In general, to maintain the state of snapshot instances, the snapshot may need to copy the data needed to be protected into free space on the same volume. In order to identify whether a block is free, a snapshot record is created for each block on a volume to record write operations on the block. With these snapshot records, the allocation status of blocks on a volume can quickly be identified. Free space allocation is then accomplished by allocating free space via the file-system provided interface and identifying it with snapshot records. With this mechanism, snapshot software can allocate free space to store snapshot metadata and "copy-to-write" data dynamically.

To effectively maintaining snapshot instances when multiple snapshot instances are created, snapshot records are unified and shared among all snapshot instances. This method provides an efficient way to maintain snapshot instances when performing snapshot functions. Maintaining snapshot instances are accomplished by updating snapshot records. A mechanism is devised for each of the snapshot functions (creation, deletion and restoration) to update snapshot records. Furthermore, "copy-on-write" data can be shared with various snapshot instances. This will reduce the amount of time used for "copy-on-write" operations and will utilize the free space on a volume efficiently.

1. The Computing Environment

Figure 1:
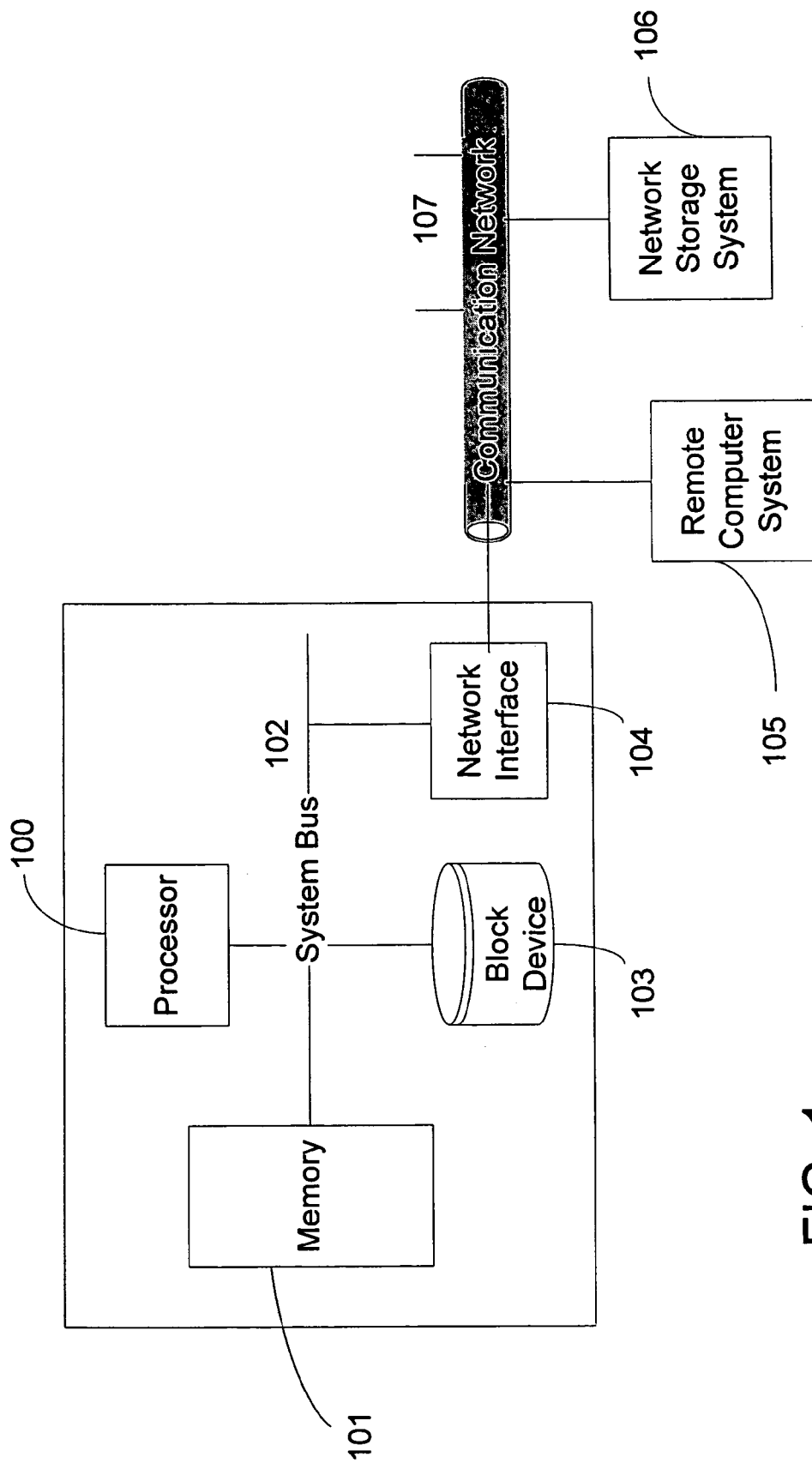
FIG. 1 illustrates a typical computing environment in which the present invention may be implemented.

FIG. 1 is an illustration of a typical computing environment in which this invention may be applied. This exemplary computing environment includes a central processor unit 100, a system memory 101, and a system bus 102 which connects various input/output facilities. FIG. 1 illustrates two kinds of these input/output facilities, including a block device 103 for storing data and network interface 104 for communicating with other computer systems on the network. A hard disk drive is an example of a typical block device, which allows data to be read and written on a block basis. An operating system provides program(s) to manage the data stored on block device(s). The block device is also referred to as a file system. In some embodiments, the block device may not connect to the system bus directly. Further, a remote computer system 105 or network storage system 106 may provide similar data storage functionality through a communication network 107.

2. The Present Snapshot System

Figure 2:
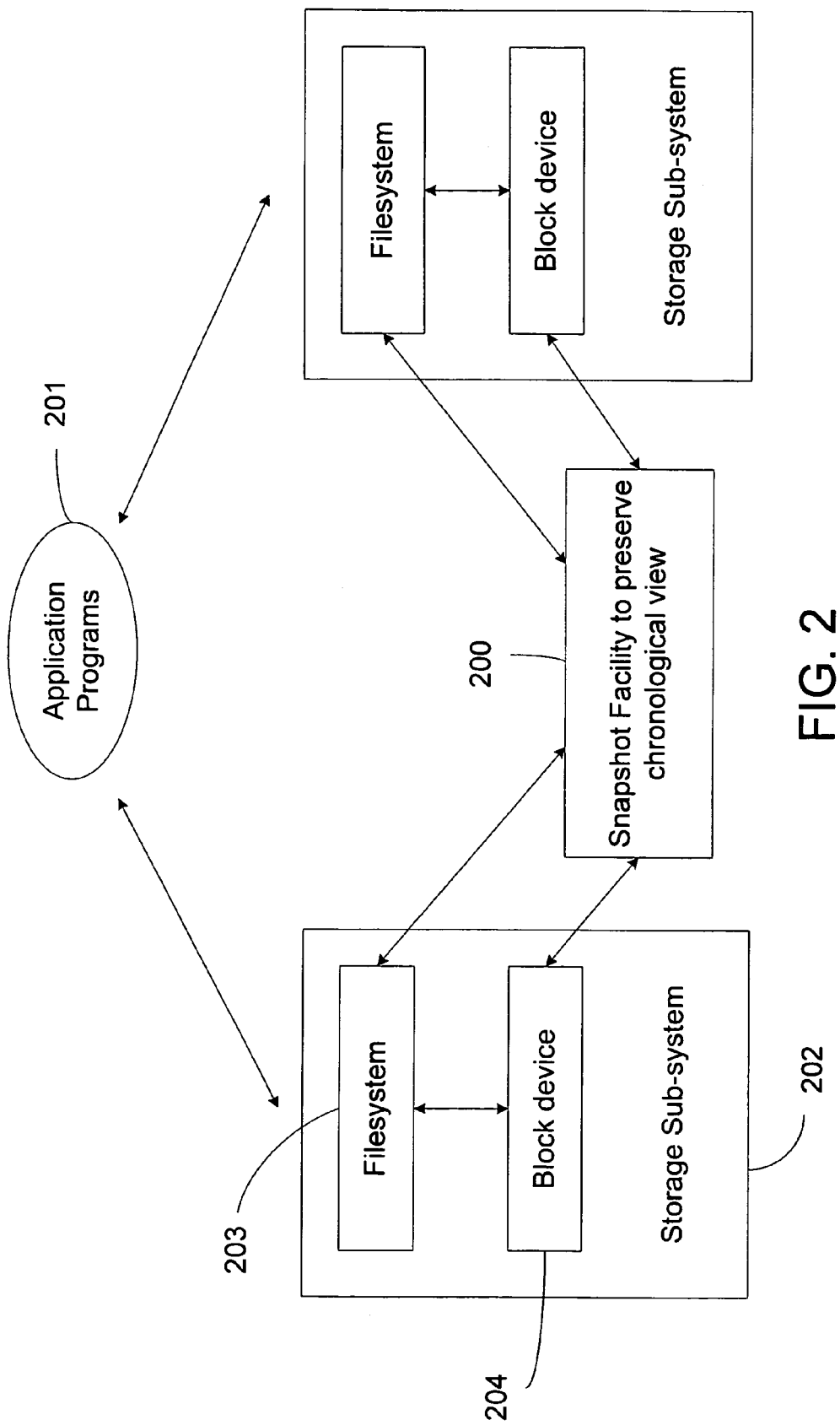
FIG. 2 is a schematic view of a snapshot facility formed in accordance with the present invention.

FIG. 2 illustrates a snapshot facility 200 in accordance with the present invention that operates within the computing environment. In a typical computing environment, application programs 201 store data in storage sub-system(s) 202 by interfacing through file system(s) 203. These file system(s) 203 are responsible for processing data input from applications programs 201 and storing the data into underlying block device 204 on a block basis. Also, application programs 201 may retrieve the stored data via the file system interface 203.

The snapshot facility 200 negotiates with the file system(s) 203 and block device(s) 204 to preserve chronological view(s) of the file system(s). This facility in one embodiment may be designed to be interfaced with a plurality of file systems and a plurality of block devices to provide snapshot functions, including snapshot creation, deletion and restoration.

Figure 3:
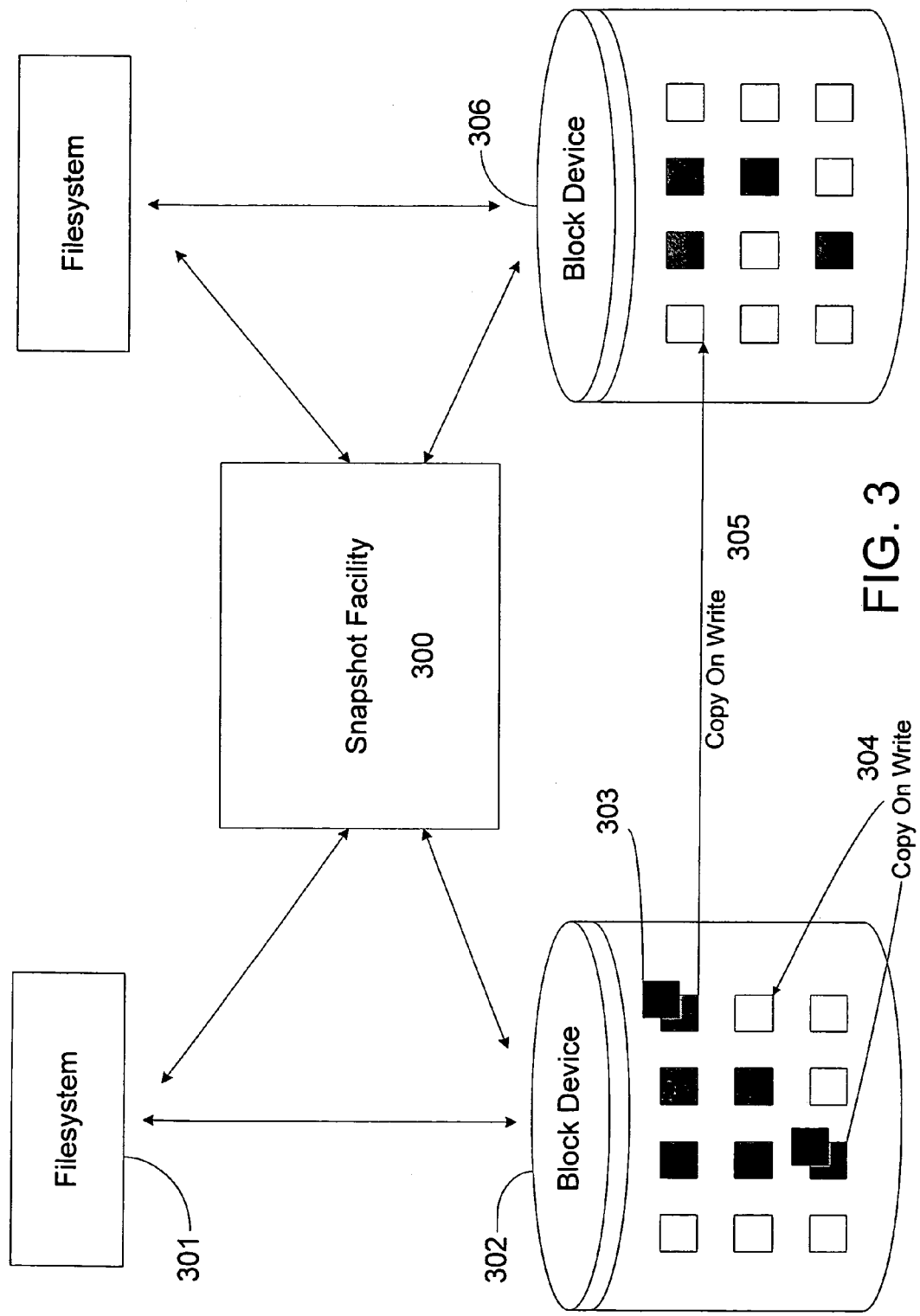
FIG. 3 is a schematic view of a snapshot facility interfacing with a plurality of file systems and block storage devices.

FIG. 3 shows the mechanism utilized by a snapshot facility 300 used to preserve chronological view(s) of file system(s). Through the interface with file system(s) 301 and block device(s) 302, the snapshot facility 300 can determine if the new data 303 being stored to the block device 302 would overwrite useful data and performs a copy on write operation 304 to backup the data being overwritten. To determine if the data to be stored should be backed up and preserved for some chronological view(s), the snapshot facility 300 maintains structures to record the last write operation of each block of the block device(s).

Once the snapshot facility 300 decides that the data on a block should be backed up prior to further write, it will allocate a free block. The allocation of the free block is done through the file system provided "block allocation function." Then, a command is issued to the block device to duplicate the data to the newly allocated block. This operation is generally called as copy on write (COW). Note that the copy on write operation is not limited in that the newly allocated block must be on the same block device. On the contrary, tt can be done across different block device(s) 305. Hence the snapshot facility is capable of duplicating data of one block device to another block device 306 to preserve chronological view(s).

Figure 4:
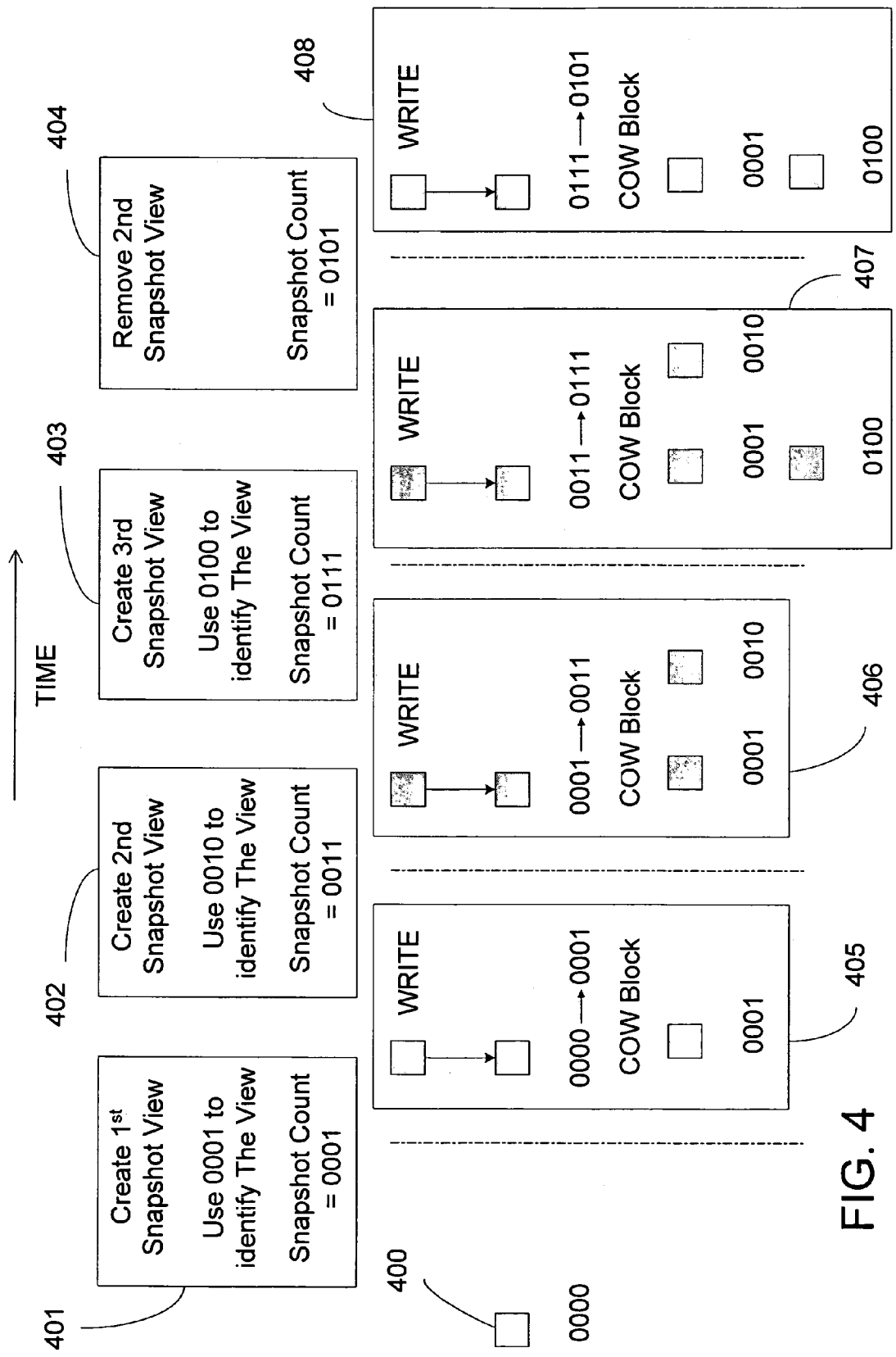
FIG. 4 illustrates how the snapshot facility records the last write operation of a specific block and determines if a copy on write operation is needed prior to further modification on the block.

FIG. 4 illustrates the mechanism used by the snapshot facility 300 to record the last write operation of a specific block and determine if a copy on write operation is needed prior to further modification on the block. A bitmap referred to as the "snapshot version bitmap" is used. The snapshot version bitmap is created and associated with each block on the block device. It is essentially a historical record of write operations issued to the block.

At a first time 400, the snapshot facility creates an all-zero snapshot version bitmap for every used block (blocks that store useful/meaningful data). These used blocks are identified by the snapshot facility 300 the first time the snapshot facility is started.

Another bitmap, named "snapshot count" is used to represent all of the chronological view(s) existing on the block device. Generally, there is only one snapshot count bitmap for each block device. When a snapshot view is created, a unique bit is allocated and updated on the snapshot count bitmap. In FIG. 4, after the creation of the first snapshot view, the snapshot count bitmap is updated to [0001] at step 401. The second snapshot view will be identified with bitmap [0010] and the snapshot count will be updated to [0011] at step 402. The third snapshot view will be identified with bitmap [0100] and snapshot count will be modified to [0111] at step 403. Deleting the second snapshot view at step 404 will modify the snapshot count to [0101].

Using the snapshot count and the snapshot version bitmap associated with each block, the snapshot facility 300 can determine if a COW operation is necessary when a block is modified. At box 405, a write operation is issued on a block after the first snapshot view is created. By doing an "exclusive or" (XOR) operation on the snapshot count [0001] and the snapshot version bitmap associated with the block [0000], the snapshot facility determines that the data stored on the block should be preserved.

The data is then copied to another block for backup. This backup data is associated with a bitmap [0001], which identifies it as a preserved data for the first snapshot view. This bitmap is called the COW bitmap. It is also stored in the entry associated with the block in the snapshot mapping table. After the COS operation is done, the snapshot version bitmap associated with the block is updated from [0000] to [0001].

At box 406, a write operation is issued on the same block after the second snapshot view created. Another COW is performed and the preserved data is associated with a COW bitmap [0010], which indicates that the data is preserved for a second snapshot view. At box 407, still additional preserved data associated with a COW bitmap [0100] is created. The preserved data block can be removed when it is no longer referred to by any snapshot view. At box 408, the preserved data with the COW bitmap [0010] is removed after deletion of second snapshot view. All COW bitmap(s) and the snapshot version bitmap associated with a block are packed and stored as an entry in the snapshot mapping table.

Figure 5:
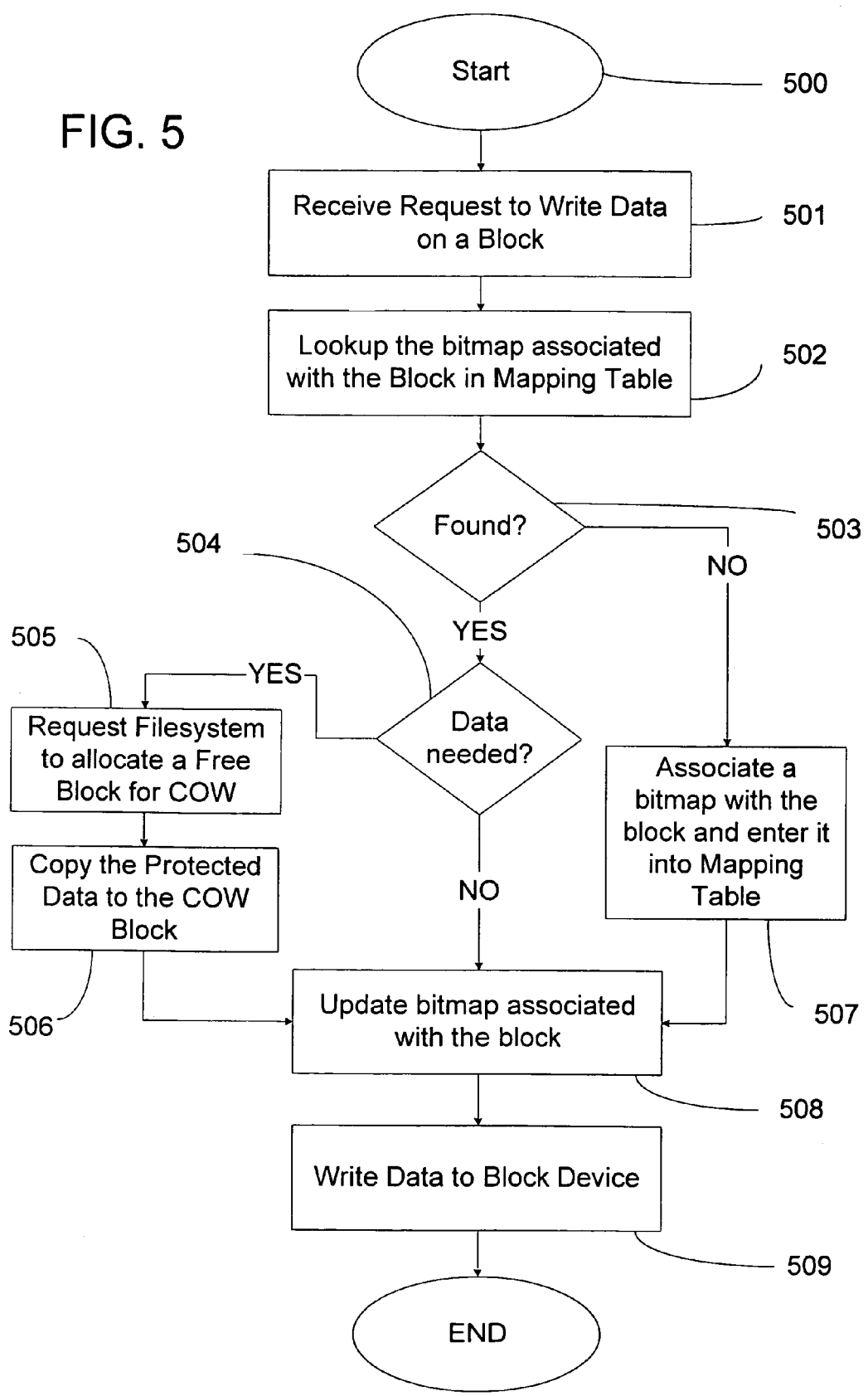
FIG. 5 is a flow diagram illustrating the process of a snapshot facility when a write operation is issued to a block device.

FIG. 5 is a logical flow diagram illustrating the process of a snapshot facility when a write operation is issued to a block device. At step 501, a block device receives a request to write data on a block. At step 502, the block device will suspend the procedures of performing this write operation and requests the snapshot facility to look up the bitmap associated with the block to be written. At decision step 503, a test is performed to determine whether the snapshot version bitmap associated with this block is found.

At step 504, a test is performed to determine whether the data stored on this block is needed to be preserved or not. The test is done by doing an exclusive-or (XOR) operation on the snapshot count and the snapshot version bitmap associated with the block. If the test determines that the data should be preserved, the snapshot facility will request the file system to allocate a free block at step 505. Then, at step 506, the snapshot facility issues a request to the block device for copying data stored on the block to the newly allocated one. This operation is generally referred as copy on write (COW).

However, if at step 503, there is not found a snapshot version bitmap associated with the block, then control passes to step 507. At step 507, a new COW bitmap is created and stored into the data entry associated with the block. At step 508, the snapshot version bitmap associated with the block is updated in order to record the last write operation of this block. Finally, at step 509, the procedure of writing data to the block is resumed and the data is then written to the block on the device.

Figure 6:
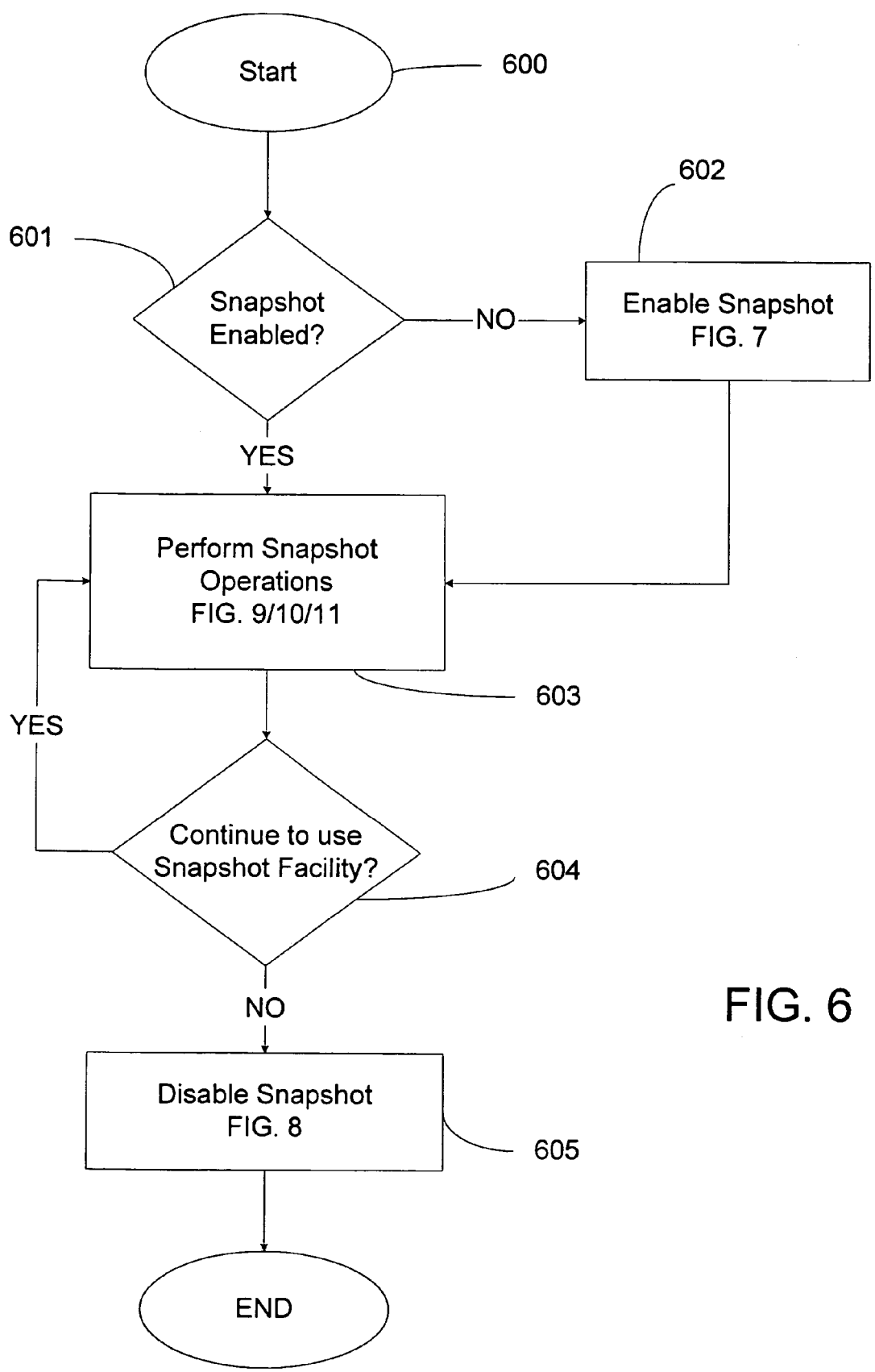
FIG. 6 is a flow diagram illustrating the process of using a snapshot facility.

FIG. 6 is a flow diagram illustrating the process of using a snapshot facility. The computing environment has to enable the snapshot facility prior to performance of any snapshot operation. At step 600, a snapshot operation is issued. At decision step 601, the snapshot facility determines whether the internal structures have been initialized. If these structures have not been initialized yet, the initialization will be done at step 602 (see FIG. 7). At step 603, a snapshot operation is performed. Operations provided by the snapshot facility are snapshot creation, snapshot deletion and snapshot restoration. At decision step 604 (FIGS. 9, 10, 11), if no further snapshot operations will be issued, the snapshot facility will be disabled in step 605 (FIG. 8). Otherwise, the facility will await the next command and repeat the cycle.

Figure 7:
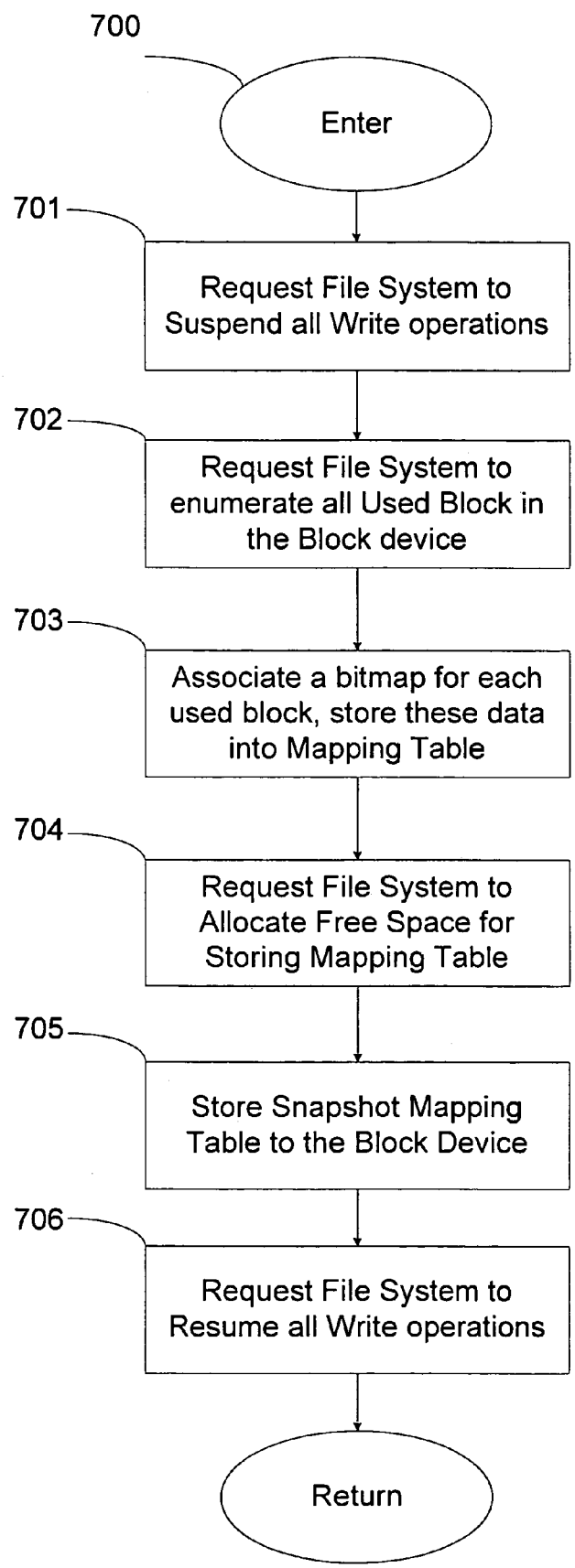
FIG. 7 is a flow diagram illustrating the process of initializing a snapshot facility.
Figure 8:
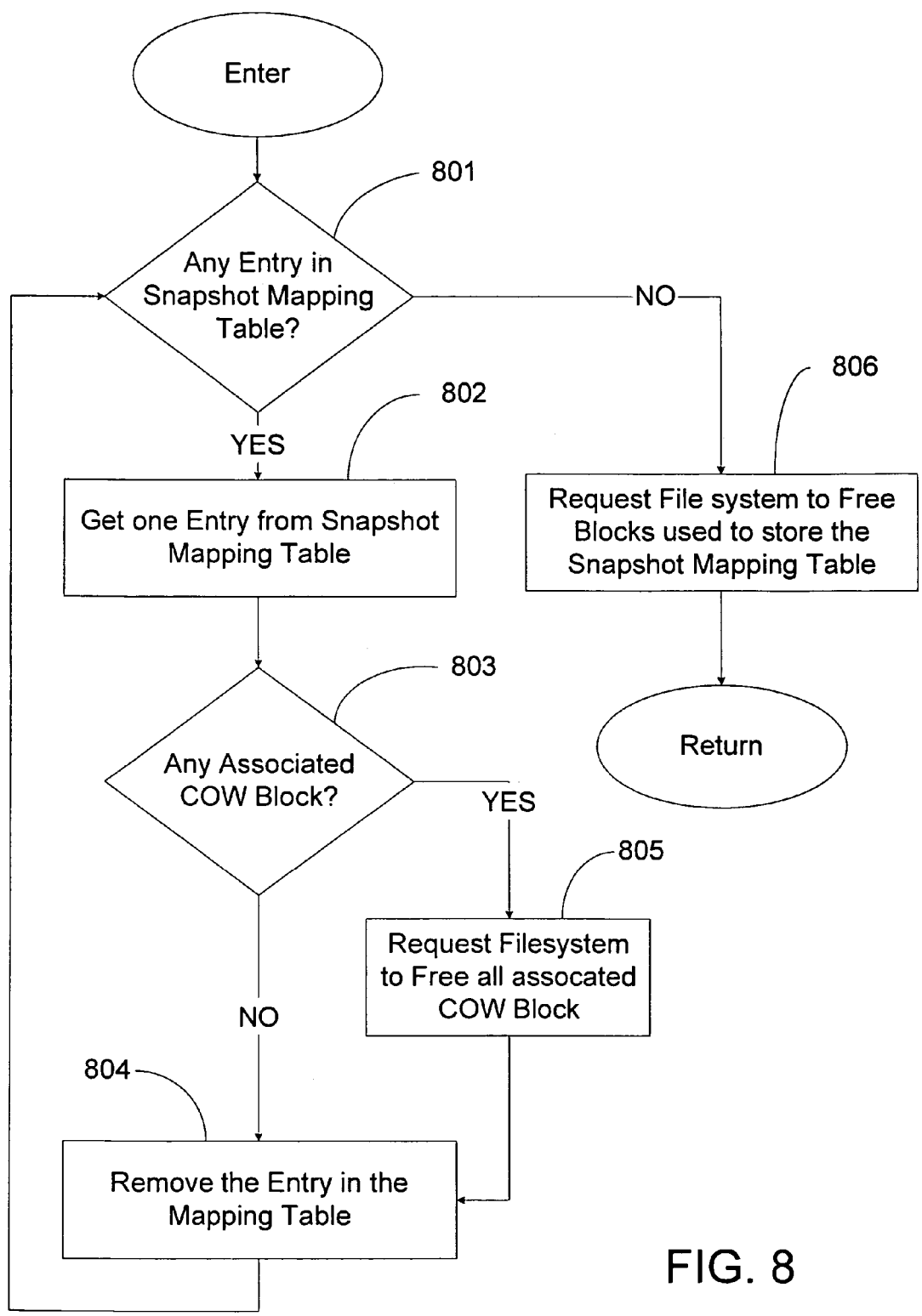
FIG. 8 is a flow diagram illustrating the process of disabling a snapshot facility.

FIG. 7 is a logical flow diagram illustrating the process of initializing a snapshot facility. At step 701, the snapshot facility sends a request to the file system for suspending all write operations. At step 702, the file system will generate a list of all blocks that are used on the block device. Based on the information on the list, the snapshot facility will create and associate a snapshot version bitmap with each block on the list 703. A data entry in a snapshot mapping table is created to store the snapshot version bitmap associated with the block.

At step 704, the snapshot facility calculates total blocks needed to store the snapshot mapping table on the block device and requests the file system to allocate free space for storing the table. At step 705, the mapping table is stored on the blocks allocated at step 704 on a block basis. The table is stored using its specific structure and is not interpretable by the file system. The only responsibility of the file system is to provide proper free space management functionality for the table to be stored. At step 706, the process to initialize the snapshot facility is completed. The snapshot facility informs the file system to resume all write operations.

FIG. 8 is a logical flow diagram illustrating the process of disabling a snapshot facility. All the data entries in the snapshot mapping table need to be removed during this operation. At decision step 801, the snapshot mapping table is checked to determine if there is any data entries left in it. If there is an entry in the mapping table, at step 802, an entry is retrieved from the table. Based on COW bitmap(s) stored in this entry, the system can determine if the data stored on the block has been copied to another block for preservation by checking the COW bitmap(s) in the entry. The block used to store the preserved data is called COW block. At decision step 803, the system will check if there is any COW bitmap in this entry. At step 805, all COW blocks indicated by COW bitmap(s) in the entry will be freed. At step 804, the entry is removed from the mapping table. Once all the entries in the mapping table are removed, the blocks used to store the snapshot mapping table are freed at step 806. The process is then completed.

Figure 9:
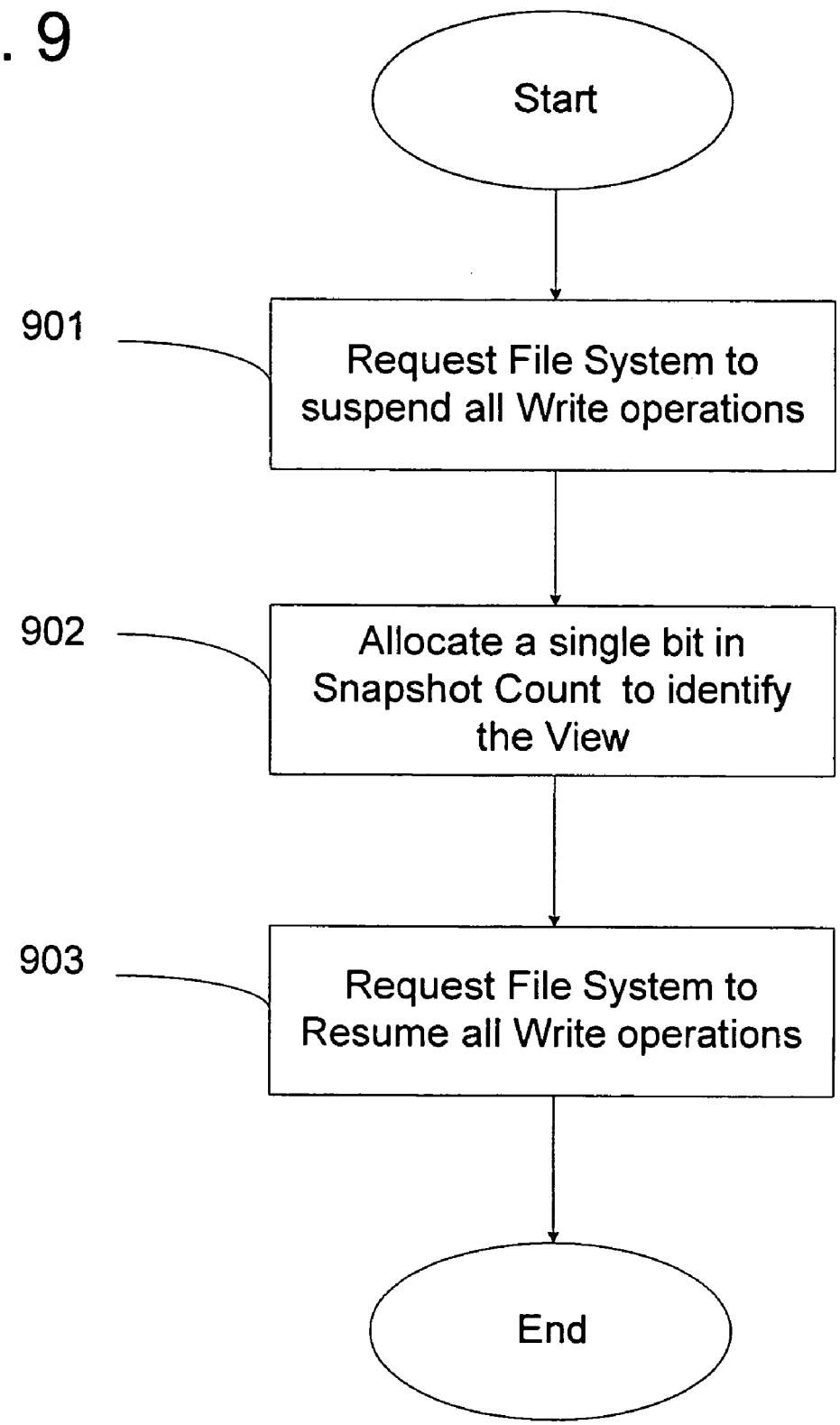
FIGS. 9–11 illustrate the process of three different snapshot operations: snapshot creation, deletion and restoration, respectively.
Figure 10:
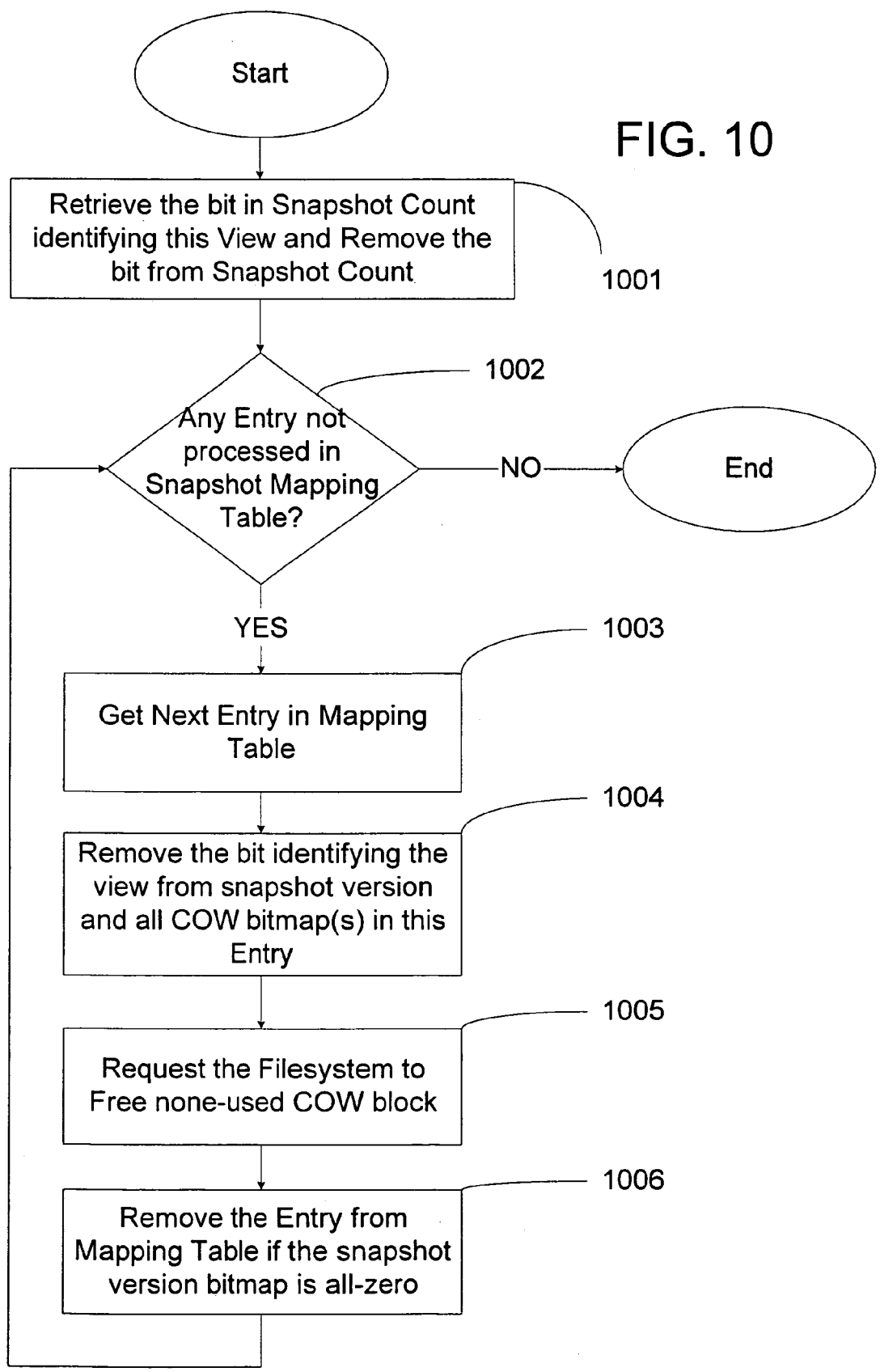
Figure 11:
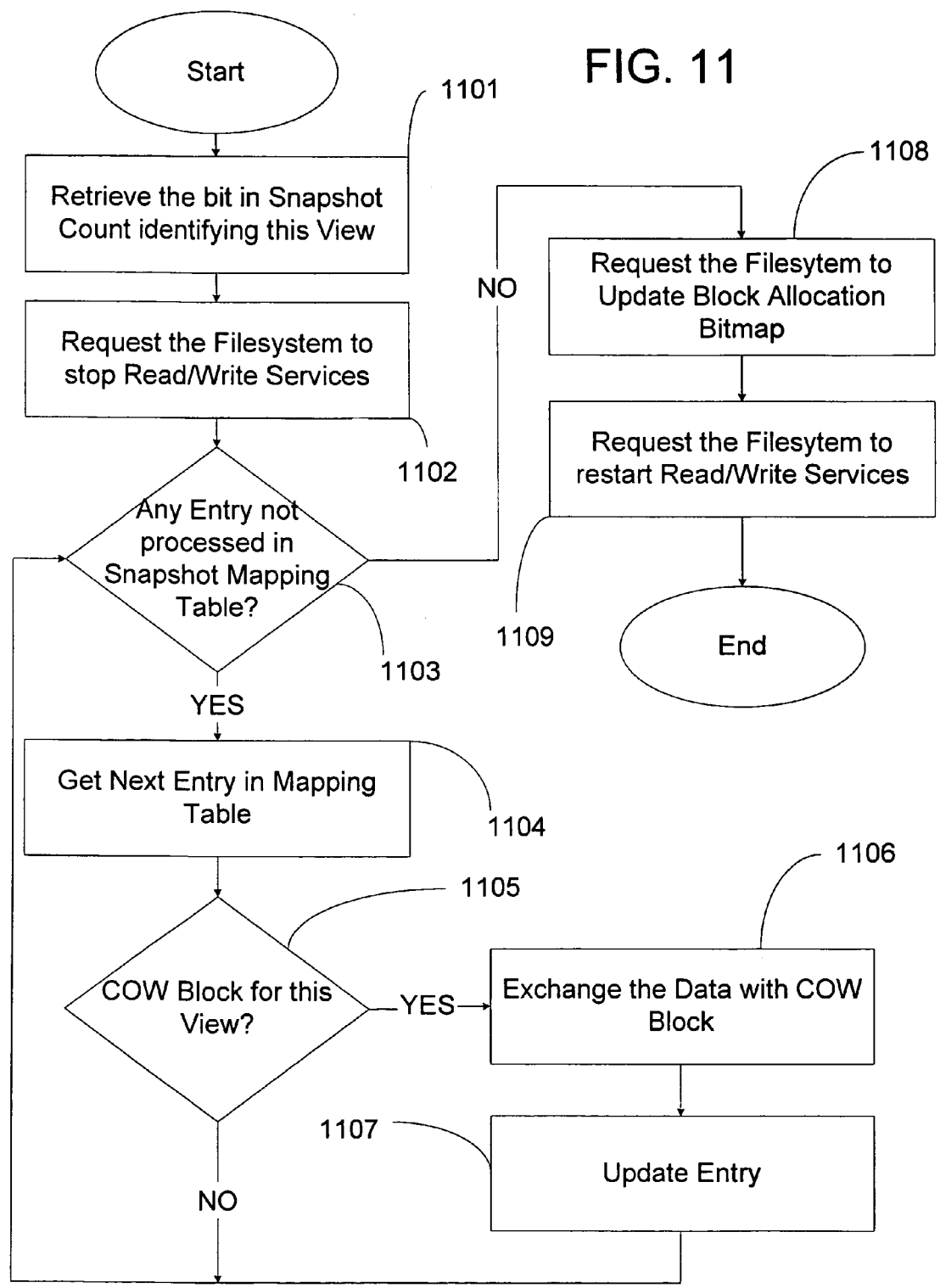

FIGS. 9–11 illustrate the process of three different snapshot operations respectively, including snapshot creation, deletion and restoration. FIG. 9 is a logical flow diagram illustrating the process of creating a new snapshot view on a block device (snapshot creation). At step 901, the snapshot facility sends a request to the file system to suspend all write operations. At step 902, a single bit is allocated in the snapshot count bitmap to identify this newly created view. The snapshot count bitmap is also updated after this allocation. At step 903, the snapshot facility informs the file system to resume all write operations and the process is complete. Since snapshot creation is the most frequently used operation, the invented system is designed to have a quick snapshot creation procedure.

FIG. 10 is a logical flow diagram illustrating the process of removing an existing snapshot view on a block device (snapshot deletion). At step 1001, the bit to identify the specific view is retrieved and removed from the snapshot count bitmap. At decision step 1002, the system determines if all entries in the snapshot mapping table have been processed. At step 1003, an entry (not being processed) is retrieved from the snapshot mapping table. At step 1004, the bit identifying the snapshot view is removed from the snapshot version bitmap and all the COW bitmap(s) in this entry. If any COW bitmap is all-zero after modification, the block it indicated is not used. At step 1005, the snapshot facility requests the file system to free these blocks. At step 1006, the entry is removed from the snapshot mapping table if the snapshot version bitmap is all-zero after modification. This cycle is repeated until all the entries in the snapshot mapping table are processed.

FIG. 11 is a flow diagram illustrating the process of restoring an existing snapshot view on a block device (snapshot restoration). At step 1101, the bit to identify this specific view is retrieved. At step 1102, the snapshot facility sends a request to the file system to stop all services. At decision step 1103, the system determines if all entries in the snapshot mapping table have been processed. At step 1104, an entry (not being processed) is retrieved from the snapshot mapping table. At decision step 1105, all COW bitmap(s) in this entry are examined to determine if there is a COW block associated with this view. If there is a COW block, the data stored in COW block is exchanged with the block the entry is associated at step 1106. At step 1107, all bitmap(s) in this entry are updated to reflect the exchange of data. This cycle is repeated until all the entries in the snapshot mapping table is processed. At step 1108, the snapshot facility sends a request to the file system for updating the block allocation bitmap of the block device. At step 1109, the snapshot facility informs the file system to restart all services. The process is then complete.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A product for interfacing with a plurality of file-systems and block devices, said product creating and handling multiple snapshot instances in a computer storage system, the product implementing the process of:

identifying one or more blocks being used;

creating a snapshot record for each of said blocks on a base volume at a first time, wherein creating a snapshot record at the first time further comprises:

(1) suspending all of the write operations issued from file systems;

(2) identifying the blocks called by file systems;

(3) creating a snapshot record for each of the identified blocks;

(4) resuming the write operations issued from the file systems to the said blocks on said base volume;

(5) counting the number of write operations being taken to the said block; and (6) creating a binding of a copy-on-write block associated with the said block as well as the associated snapshot instances;

performing snapshot management functions to said blocks on said base volume;

handling snapshot records of said blocks on said base volume at a second time; and allowing writing of data on said blocks to free space on said base volume.

2. The product of claim 1, wherein creating a new snapshot instance comprises:

allocating an unused bit in a counting bitmap to identify the created snapshot instance; and updating all of the allocated bits in the counting bitmap.

3. The product of claim 1, wherein handling a snapshot record comprises:

suspending the write operation to blocks on base volume;

updating a counting bitmap;

checking the snapshot record to determine whether a copy-on-write operation is needed;

allocating free space on the base volume; and performing the copy-on-write operation to the allocated block in free space when a copy-on-write is needed; otherwise, resuming the write operation to blocks on base volume.

4. The product of claim 3, wherein allocating free space on the base volume comprises:

selecting an unused block on the base volume;

identifying the selected block in the snapshot record;

updating block allocation bitmap and snapshot block allocation bitmap of file system.

5. The product of claim 4, wherein allocating free space for storing snapshot records comprises:

dynamic allocating one or more free blocks when size of snapshot record grows and freeing allocating blocks when size of snapshot record shrinks.

6. The product of claim 4, wherein freeing blocks on the base volume further comprises:

marking the freed blocks as unused ones in both the block allocation bitmap and the snapshot block allocation bitmap of file system.

7. The product of claim 1, wherein handling a snapshot instance created on the base volume during a delete operation comprises:

suspending all write operations issued from file system to the base volume;

identifying a counting bit corresponding to the said snapshot instance;

removing unused record of write operation to its associated block; finding all copy-on-write blocks associated with said snapshot instance;

freeing said copy-on-write blocks when they have no other snapshot instance to associate with; otherwise, resuming all pending write operations issued from file system to base volume.

8. The product of claim 1, wherein handling a snapshot instance being created on the base volume during a storing operation further comprises:

restraining all write operations issued from file system to said base volume;

identifying all copy-on-write blocks associated with said snapshot instance;

exchanging data on copy-on-write blocks with data on the blocks associated with the snapshot instance;

updating the state of snapshot record;

updating the block allocation bitmap and snapshot block allocation bitmap of file system;

restarting the write operations of the file system to the base volume.

9. The product of claim 8, wherein updating the block allocation bitmap and snapshot block allocation bitmap of a file system comprises:

freeing all blocks being marked as used in the snapshot block allocation bitmap;

marking blocks which are currently used by the product as used in both bitmaps.

* * * * *